June 9, 1925.                                                    1,540,866
V. A. SAMUELSON ET AL
IGNITION CIRCUIT BREAKER FOR MOTOR VEHICLES
Filed May 23, 1921
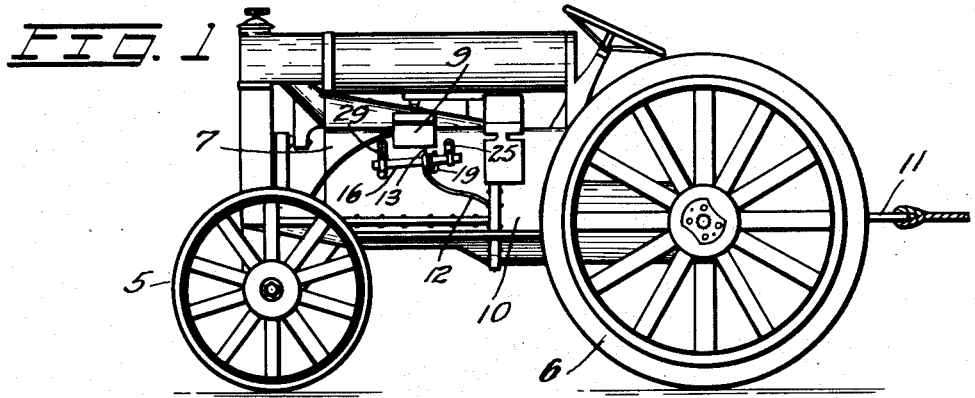
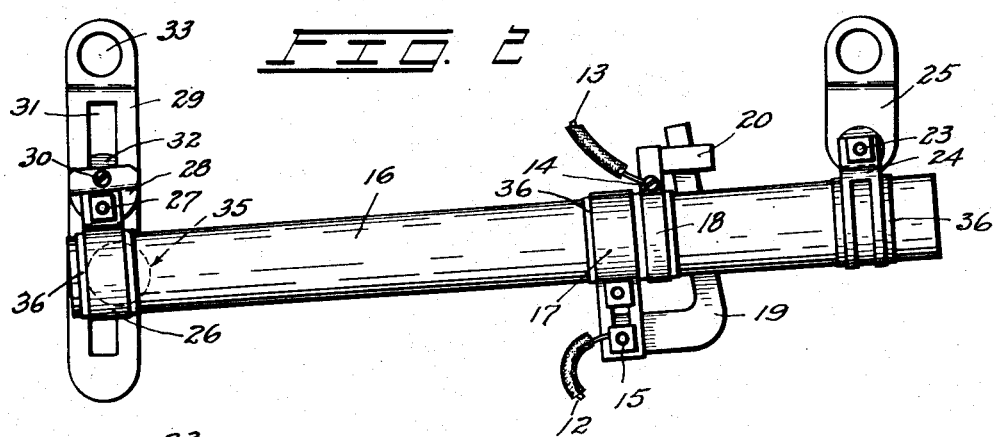
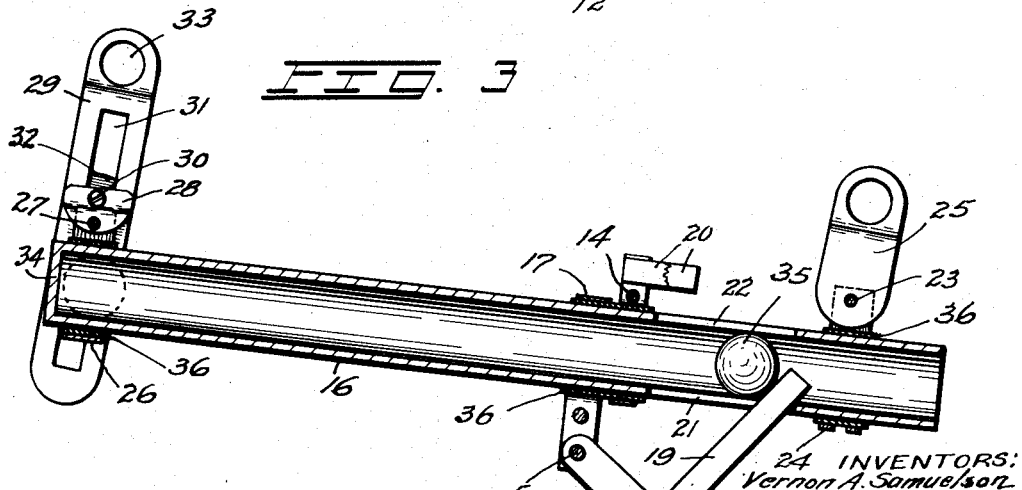
INVENTORS:
Vernon A. Samuelson
Yorke Young and
Calvin Lightheart
by Pierre James
ATTORNEY Patented June 9, 1925.

1,540,866

UNITED STATES PATENT OFFICE.

VERNON A. SAMUELSON, OF PORT ANGELES, AND YORKE YOUNG AND CALVIN LIGHT-HEART, OF SEQUIM, WASHINGTON; SAID YOUNG ASSIGNOR TO SAID SAMUELSON AND LIGHTHEART.

IGNITION-CIRCUIT BREAKER FOR MOTOR VEHICLES.

Application filed May 23, 1921. Serial No. 471,872.

*To all whom it may concern:*

Be it known that we, VERNON A. SAMUELSON, residing at Port Angeles, and YORKE YOUNG and CALVIN LIGHTHEART, residing at Sequim, in the county of Clallam and State of Washington, citizens of the United States, have invented certain new and useful Improvements in Ignition-Circuit Breakers for Motor Vehicles, of which the following is a specification.

This invention relates to circuit breakers for use in the ignition circuits of motor-vehicle engines.

Considerable trouble and danger is often times experienced with tractors because of their tendency to rear up and tilt over rearwardly in hauling a load or machine when the travel of the latter is arrested by its encountering an obstruction while the traction wheels of the tractor continue to function.

The object of the present invention is to provide simple, inexpensively constructed and efficient appliances on tractors which will become operative in the early portions of such rearing up movements of the tractor to effect the cutting out of the engine electrical ignition circuit to "kill" the engine and render the traction wheels incapable of elevating the forward part of the vehicle into a position dangerous to the driver. Other objects and advantages of the invention will appear from the following description.

The invention consists in the novel construction, adaptation and combination of parts hereinafter described and claimed.

In the accompanying drawings,—

Figure 1 is a side elevation of a circuit breaker embodying my invention shown applied to a tractor. Fig. 2 is a side elevation of the circuit breaker shown detached and to a scale larger than that in which it is shown in Fig. 1. Fig. 3 is a longitudinal vertical section of Fig. 2 and illustrated in a different position.

In Fig. 1 we illustrate a tractor of well known type having ground steering and traction wheels such as 5 and 6 of which the traction wheels are driven by any suitable power transmission mechanism from an internal combustion engine 7. The engine is equipped with the usual spark plugs, not shown, which are in the ignition circuit including a coil box 9, and a battery or a magneto provided with a housing 10. A load is attached to the tractor as by means of a draw bar 11 extending rearwardly from the traction wheel axle.

According to the present invention, the circuit wire leading from the magneto or battery, to the coil box 9 is divided into two parts 12 and 13 which are respectively connected to binding posts 14 and 15 of a switch. The switch is connected to a tubular support 16 by means of two clamping rings 17 and 18 which constitute the switch terminals, the former carrying the hinge element for the switch knife 19 which is engageable between clip elements 20 of the ring 18.

As shown in Figs. 2 and 3, the hinge connection of the knife is located below the support 16 thence the knife extends upwardly through slots 21 and 22 provided at diametrically opposite sides of the support to engage the clip elements which are located above said support.

For use the tubular switch support 16 is desirably disposed at one side of the engine. As represented in the drawings, said support is connected adjacent its forward end by means of a fulcrum pin 23 extending through a clamping ring 24 provided upon the support to a plate 25 which is secured to the engine.

Adjacent to its rear end said support has secured thereto a clamping ring 26 which is engaged by means of a bolt 27 with a bracket 28 which is adapted to be adjustably secured at predetermined elevation to a hanger 29 by means of a bolt 30 passing through a slot 31 in the hanger and engaging in a plate 32 at the rear side of the latter. The hanger 29 is provided near its upper end with an aperture 33 to receive a bolt whereby the hanger is attached to the engine.

The forward end of said tubular support is closed as by a wall 34. Provided within the tubular support 16 for the switch is a ball 35 formed of a heavy material and serves upon occasion to open the aforesaid circuit by dislodging the knife 19 from between the clips 20.

The tubular support 16 may be formed of any suitable material and if the same has electric conducting qualities, insulating material, indicated by 36, is interposed between the support and the various attachments thereto.

Normally the device is regulated and secured to have its longitudinal axis inclined from the horizontal and with the closed forward end lowermost.

Under such a condition the ball 35, as indicated by dotted lines in Fig. 2, will be in juxtaposition to the end wall 34.

Thus arranged and with the switch knife connected with the switch clips 20, as in Fig. 2, the electric circuit is complete to afford current to actuate the spark plugs to effect the operation of the engine for driving the traction wheels to propel the tractor.

In the event of a load such as a plow, for example, which is being hauled encountering an object which will prevent further progress of the load, a strain is transmitted through the draw bar 11 to the tractor which will first stop the latter and then act to elevate the front end of the same. Such rearing movement of the tractor is facilitated by the rotation of the traction wheels and, unless these wheels cease to be rotated when the travel of the tractor is stopped, the tractor will usually be overturned resulting in serious, and oftentimes fatal, accidents to the tractor driver by his becoming crushed under the vehicle.

The present invention overcomes the danger above referred to by affording means to automatically break the engine's ignition circuit through the instrumentality of the ball 35 which will be projected by the force of gravity against the knife 19 to open the switch when the forward end of the ball containing switch support ascends above the level of the rear end thereof.

When the switch is thus opened the engine stops and the traction wheels become inert until the switch is manually closed. The knife 19 is made sufficiently long to have its free end extend as shown in Fig. 3 into the runway of the ball when the knife is in its inoperative position with respect to the complementary switch parts thereby affording a stop for the ball.

While we have illustrated and described the preferred construction of the device as applied upon tractors in use, we do not wish to be understood as confining ourselves specifically thereto, as change may obviously be made without departing from the spirit of the invention and within the scope of the following claims.

What we claim, is,—

1. A circuit breaker comprising a tube, supporting members pivoted to the tube, the tube being closed at one end and having near the other end slots in the diametrically opposite sides thereof, a switch mounted on said tube and having its movable element normally extending through said slots, a ball within the tube between the closed end thereof and said switch element, said ball adapted to contact with and effect the opening movement of the movable switch element when the closed end of the tube is raised above the other end of the tube.

2. A circuit breaker comprising a cylindrical tube closed at one end and opened at the other end and having diametrically opposite slots in the sides thereof adjacent the open end, means for attaching the tube in selected angular planes from the horizontal, a normally closed knife switch attached to said cylindrical tube and arranged to have the knife element extending through said slots, a ball normally positioned adjacent the closed end of the tube and adapted to roll within said tube against said knife element disposed in the path of the ball to open the switch when the closed end of the tube is raised to a higher elevation than the open end of the tube.

Signed at Port Angeles, Washington, this 14th day of May 1921.

VERNON A. SAMUELSON.
YORKE YOUNG.
CALVIN LIGHTHEART.